Figure 1:
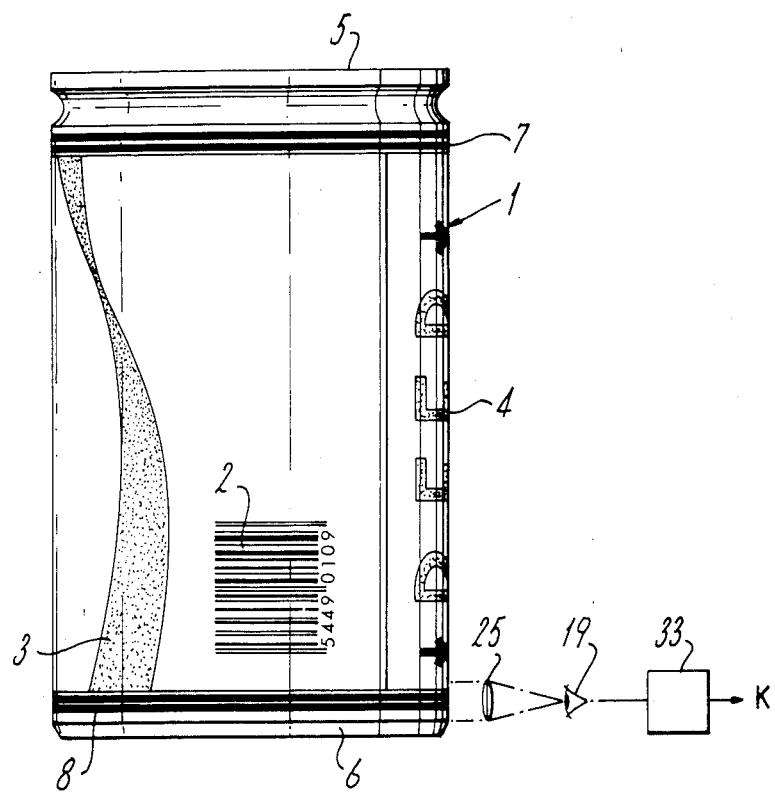

United States Patent [19]

Planke

[11] Patent Number: 4,642,470
[45] Date of Patent: Feb. 10, 1987

[54] METHOD AND AN APPARATUS FOR THE IDENTIFICATION OF METAL CANS

[75] Inventor: Tore Planke, Nyuirke, Norway

[73] Assignee: A/S Tomra Systems, Oslo, Norway

[21] Appl. No.: 577,863

[22] Filed: Feb. 7, 1984

[30] Foreign Application Priority Data

Feb. 7, 1983 [NO] Norway ............................ 830400

[51] Int. Cl.$^4$ ............................................ G06K 7/10
[52] U.S. Cl. ................................. 250/566; 194/205; 235/462
[58] Field of Search ............... 100/902; 194/4 C, 4 R, 194/4 E, 46; 250/223 R, 223 B, 566, 568; 235/435, 462, 494

[56] References Cited

U.S. PATENT DOCUMENTS

| | | | |
|---|---|---|---|
| 3,673,417 | 6/1972 | Wahli | 250/566 |
| 4,230,266 | 10/1980 | Juvinall | 250/223 B |
| 4,244,650 | 1/1981 | Garfunkel et al. | 250/223 B |
| 4,443,697 | 4/1984 | Ryan et al. | 250/566 |
| 4,492,295 | 1/1985 | De Woolfson | 194/4 C |

Primary Examiner—David C. Nelms
Assistant Examiner—L. W. Madoo
Attorney, Agent, or Firm—Kenyon & Kenyon

[57] ABSTRACT

A method for the identification of metal cans for beverages or the like, at least one area of identification (7; 8) being provided extending around the entire circumference of the can (1) and not being interrupted by a possible other decoration or the like on said can, which area of identification (7; 8) is formed by a number of alternating contrasting stripes (9-13) the mutual width ($\tau_1$, $\tau_2$, $\tau_3$) of which is measured by at least one detector (19-25; 20, 20"; 23; 32'), an identification value (K), e.g. a deposit value, which is characteristic of said can being calculated by the aid of a calculating circuit (33). The measurement may be carried out while said can passes the detector or is briefly at rest. The can is provided with two areas of identification (7;8) at the upper and lower end portions, respectively, of said can (1). The areas of identification (7;8) are provided on said can simultaneously with any other decoration or the like (3, 4, 5,). The apparatus provided for carrying out said method comprises said detector and the detector may be optically connected with a read head (20). Said read head may comprise two parts (21, 22), one (21) of which being optically connected with the detector (19) and the other part (22) being connected with a light source (24) for illuminating the area of identification on the can. The transition between said two parts (21,22) is defined by a straight separating line (23) oriented in parallel with the stripes of the area of identification.

14 Claims, 9 Drawing Figures

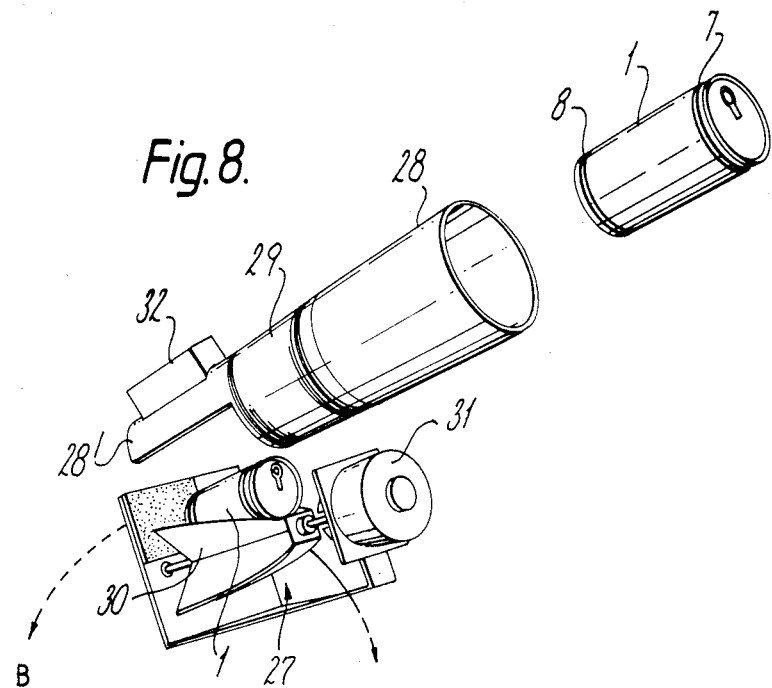
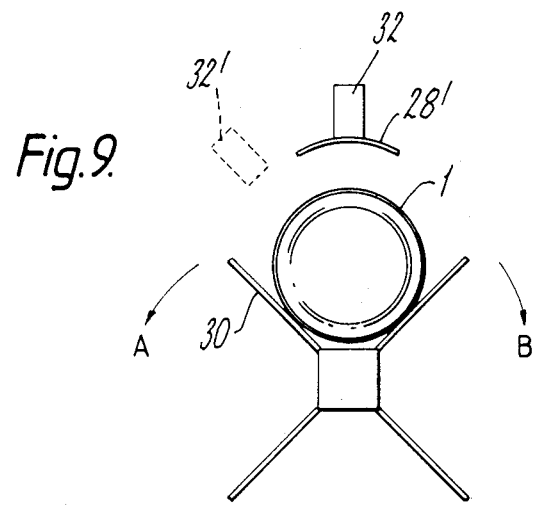

METHOD AND AN APPARATUS FOR THE IDENTIFICATION OF METAL CANS

The present invention relates to a method and an apparatus for the identification of metal cans for beverages, as well as a metal can to be identified, as stated in the preamble of the attached independent claims.

In recent years, it was found desirable to establish a return system for metal cans for beverages, both in order to achieve a maximum degree of recirculation of the metal and to prevent litter being dumped in the environment.

According to the NO Patent Application No. 82 3621 an apparatus is proposed for separating cans that cannot be recirculated, either because they are made from the wrong kind of metal or because they contain foreign matter.

It was, however, suggested to introduce a deposit refund system in connection with sale of beverages in cans, inter alia as a contribution to the return of a maximum number of cans for compression and remelting. In this connection, several problems arise that have to be solved. One of these problems is that a large number of cans is already in existence, owned by buyers as well as sellers, for which no deposit was paid. If such cans were to be returned together with the cans for which a deposit had been paid, possibly with the intent of obtaining an unwarranted deposit refund, this might result in considerable losses to the receiver of the empties. An aluminium can, to-day, has a metal value of approx. NOK 0.06 (U.S. $0.01). Assuming a refund value of e.g. NOK 0.25 (U.S. $0.04) it will be pretty obvious that the losses may reach tens of millions. Also, it might be decided to increase the deposit some time after the introduction of a deposit refund system, e.g. because of a desire to receive a larger amount of returned cans.

The present invention, thus, has the object to solve the said problems by simple means.

Figure 2:
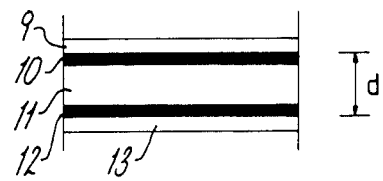
Figure 3:
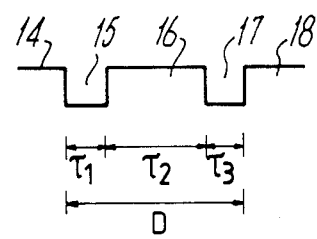
Figure 4:
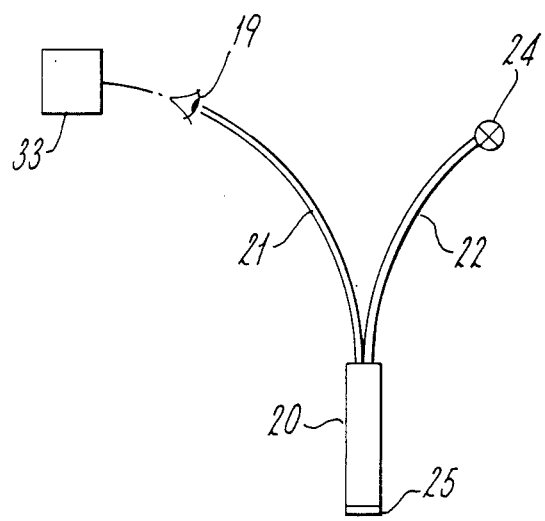
Figure 5:
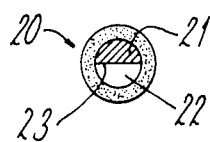

The features characterizing the method, apparatus and metal can will appear from the following claims as well as from the following description with reference to the attached drawings where, FIG. 1 shows a metal can provided with an area of identification according to the invention, FIG. 2 shows a portion of the area of identification according to the invention, FIG. 3 illustrates the signal detected due to the area of identification, FIGS. 4 and 5 show an optical detector for identification of the area of identification applied to the metal can, FIGS. 6, 7, 8, and 9 illustrate the arrangement of detectors in a guide for the can.

In FIG. 1 a metal can 1 is shown, that may be provided with a price code in a manner known per se, as well as with a decoration 3 and a text 4. The can has been provided with a partly tearable cover 5, that was rolled on, and the bottom 6 of the can has been bevelled in a manner known per se so as to facilitate stacking of the cans.

When the can is returned the price code area 2 will not be suitable for refund value identification, since this would necessitate an exact positioning of the area 2 relative to a reading head, which would result in an unduly expensive technical solution.

According to the invention it is, thus, suggested to provide an area of identification at both ends of the can.

In FIG. 1 an area of identification 7 is indicated at the upper end of the can, and another preferably identical area 8 at the lower end of the can. However, it is essential that said areas of identification extend around the entire circumference of the can. Thus, it is no longer necessary to be concerned with the orientation of the can in order to enable a detector to detect such an area.

The code of the areas of identification will be best understood with reference to FIGS. 2 and 3. As shown, the area of identification comprises a number of alternating bright and dark stripes bright stripes being provided at the outer edge and marked 9 and 13. Between these there are two dark stripes 10 and 12 separated by a bright stripe. The outside distance between said dark stripes 10 and 12 is marked d. The areas of identification or strips 7 and 8 are detected by several detectors 19, which will be described in more detail below.

When the area of identification is illuminated the signal detected by detector 19 from the area or strip 7 or 8 will have a pulse shape as shown in FIG. 3, where the signal portions 14, 15, 16, 17, and 18 correspond to stripes 9, 10, 11, 12, and 13 respectively. The signal interval D here corresponds to said distance d.

By varying the width of stripes 10 and 12, maintaining the distance d constant, the width of stripes 11 will necessarily change as well. It will be obvious, that by detecting the duration $\tau_1$ of pulse 15, $\tau_2$ of pulse 16 and $\tau_3$ of pulse 17 a large number of different values regarding refund value information and the like about the can may be formed. Such a value K may e.g. be determined in the following manner:

$$K = \frac{\tau_2}{\tau_{REF}}, \text{ where } \tau_{REF} = \frac{\tau_1 + \tau_3}{2}$$

The value K will, thus, give an unambiguous information e.g. on the refund value of the can, or whether it is a can that is not recirculatable. The value K is calculated in a calculating circuit 33.

The detector 19 can consist of a photo cell with a lens, or e.g. a CCD (Charge Coupled Device) line camera having a lens and a flashlight. In a preferred embodiment which, however, does not limit the invention, the detector 19 is connected without a lens via fibre optics to a read head 20. The fibres in said read head 20 are separated into two bundles 21 and 22, each bundle having a semi-circular cross-section such that the bundles may be positioned adjacent to each other along a common plane 23 within the read head. At the end of the first bundle 21 the photo detector 19 is provided, and at the end of the second bundle 22 a light source 24 is provided. The light source 24 may be in the visible or the infrared spectrum. By arranging the transition line 23 in parallel with the stripes of the area or areas of identification, the photo detector 19 will detect the changes of the reflected emitted light from the bright and dark stripes when the can passes said detector, i.e. said read head 20. The detector end, i.e. said read head is provided with a protective glass 25 which also ensures a certain distance from the fibre ends to the stripe code on the can. In this manner a simple detection of the areas of identification is achieved which is uncritical as regards adjustments. However, it will be understood that the detector and the other associated members may have various embodiments, and that it is not necessary to use fibre optics.

Figure 6:
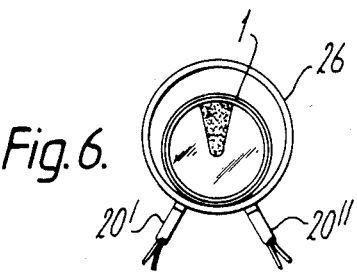
Figure 7:
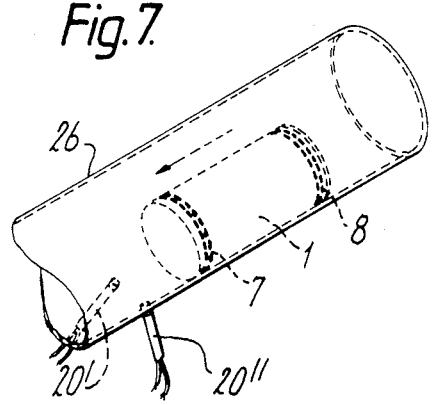

FIGS. 6 and 7 show how the can 1 may be fed through a guide 26. Said guide may be of the same kind as the guide shown in NO Patent Application No. 82 3621, or it may form part of the latter. As shown, two detector units 20' and 20" (e.g. of the same kind as 20 in FIGS. 4 and 5) are provided at a mutual distance in a common plane normal to the axis of guide 26 such that the encoded can passes the detector as it is fed through the guide. The can being provided with two areas or strips 7 and 8, a total of 4 readings of the same information is achieved. This provides substantial reading safety, possible false signals being easily detected.

Such false signals might arise due to the following: When text, decoration, price area and deposit identification areas/stripes are provided, this is done in one operation, usually by rolling on the information. Between the beginning and the end of said information a minor displacement in the axial direction of the can may sometimes occur, which may cause a discontinuity in the strips 7, 8 extending around the can.

If one of the detectors detects the area/strip at the localization of such a discontinuity, a false signal may occur. It is, thus, important to have another detector that may detect laterally from said discontinuity. However, it may also happen that the can is scratched, so that an unambiguous detection cannot take place at one of the detectors. Thus, the use of at least two detectors and two deposit identification strips 7 and 8 is regarded as a preferred embodiment of the invention.

As shown in FIGS. 8 and 9, the present invention may be used in connection with a measurement-cradle 27, e.g. as described in NO Patent Application No. 82 3621. Analogous with the solution of FIG. 7 the can 1 is guided through a tube shaped guide 28 and lands in a cradle 30 where the can may be stopped for a brief time. The guide preferably contains a metal detector 29 such as the one described in the above mentioned Norwegian Patent. When said can 1 is at rest in the cradle, but before said cradle is set to move by a stepping motor 31 for measuring, the areas of identification are scanned and detected, e.g. by a CCD camera, e.g. by use of flashlight. Camera 32 may be placed in a cut off extension 28' of tube 28, as indicated in FIGS. 8 and 9, or it may be placed somewhat laterally of the outlet end of tube 28, as indicated by reference number 32'. FIGS. 8 and 9 are only intended as an example of how a can may be detected while it is at rest. The solution according to FIGS. 8 and 9 is, thus, not a limitation of the invention. A and B indicate the two directions of movement of cradle 30, A being the throw-out direction for acceptable cans, and B indicating the direction for cans not being acceptable and being returned to the customer.

According to the present invention, said areas of identification 7 and 8 may, thus, form part of the can decoration, and it is not necessary that the strips are e.g. white and black, respectively. It is essential that a good contrast is formed between the bright and the dark stripes. Complementary colours can, thus, form such contrasting stripes. The relation between bright and black stripes, as indicated at the price area 2 in FIG. 1, is known per se from the American UPC-code and the European EAN-standard.

It will be obvious that stripes 9 and 13 have the function to limit the outer edges of stripes 10 and 12. The number of stripes may be reduced or increased if desired, but it should be mentioned that it is desirable to keep the areas 7 and 8 as narrow as possible out in view of the remaining decoration on the can. Furthermore, it is an absolute requirement that the areas 7 and 8 are not interupted by some other decoration or text on the can.

I claim:

1. A method for the identification of a beverage can comprising:
    illuminating a plurality of contrasting alternately arranged stripes which are imprinted on the can, the stripes extending continuously around the entire circumference of the can such that the orientation of the circumferential surface of the can is not critical to the identification;
    detecting the light reflected from said contrasting stripes with a detector, such that a pulsed signal is generated, the pulsed signal shape being a function of the relative widths of the stripes; and
    calculating an identification value for the can, said value being a function of the relative widths of the stripes.

2. A method in accordance with claim 1 further comprising the step of maintaining the can in a fixed position during the illuminating and detecting steps.

3. A method in accordance with claim 1 further comprising the step of maintaining the can in continuous motion during the illuminating and detecting steps.

4. A method in accordance with claim 1 further comprising the step of disposing of the can as a function of the identification value.

5. An apparatus for the identification of a beverage can comprising:
    a cylindically shaped, can having a first end and a second end, the can having imprinted thereon at least one measurement area, the area comprised of a plurality of stripes, the stripes extending continuously and entirely around the circumference of the can each stripe being separated from an adjacent stripe by a contrasting stripe;
    a guide through which the can may be transported;
    means for illuminating the stripes while the can is within the guide;
    means for detecting light reflected from the illuminated stripes, such that a pulsed signal is generated, the pulsed signal shape being a function of the relative width of the alternately arranged stripes; and
    a calculating circuit which uses the pulsed signal to calculate an identification value, the value being a function of the relative widths of the alternatively arranged stripes.

6. An apparatus in accordance with claim 5 further comprising means for maintaining the can in a fixed, stationary position adjacent to the illuminating and detecting means.

7. An apparatus in accordance with claim 5 wherein the can has a first measurement area positioned around the circumference of the can adjacent to the first end of said can and a second measurement area positioned around the circumference of the can adjacent to the second end of said can.

8. An apparatus in accordance with claim 5 wherein the means for detecting the reflected light comprises:
    a read head positioned in the guide such that the measurement area may be viewed when the can is within the guide;
    a photo detector for generating the pulsed signal; and
    a first fiber optics bundle connecting the reading head with the photo detector.

9. An apparatus in accordance with claim 8 wherein the means for illuminating the measurement area comprised:
- a source of illumination light; and
- a second fiber optics bundle which connects the light source to the read head such that the illumination light passes through the read head to illuminate the measurement area on the can.

10. An apparatus in accordance with claim 9 wherein the first and second fiber optic bundles each have a semicircular cross-section where they join the read head such that the bundles may be positioned adjacent to each other along a common plane where they are joined to the read head.

11. An apparatus in accordance with claim 9 wherein the photo detector is a CCD line camera.

12. A beverage can suitable for identification comprising:

- a hollow cylindrically shaped container having a first end and a second end; and
- at least one measurement area comprised of a plurality of stripes which extent continuously and entirely around the circumference of the container, each stripe being separated from an adjacent stripe by a contrasting stripe such that the relative width of the stripes and contrasting stripes may be used to identify the can.

13. A beverage can in accordance with claim 12 comprising a first measurement area positioned around the circumference of and adjacent to the first end of the container and a second measurement area positioned around the circumference of and adjacent to the second end of the container.

14. A beverage can in accordance with claim 13 wherein the can is comprised of metal.

* * * * *